March 27, 1962 L. H. KINSLEY 3,026,991
FEED SCREW
Filed Nov. 2, 1959
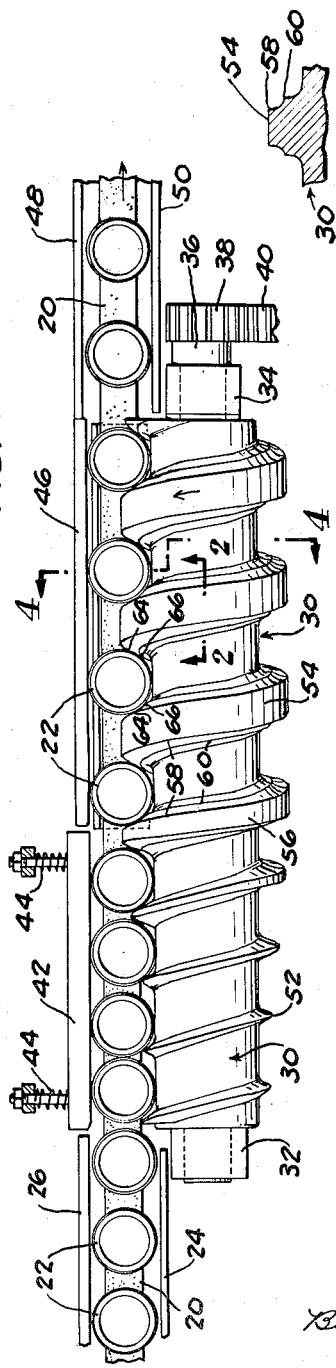
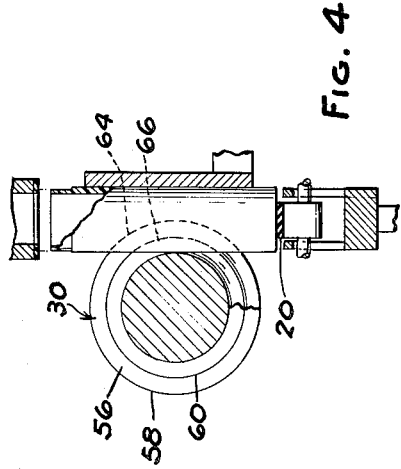
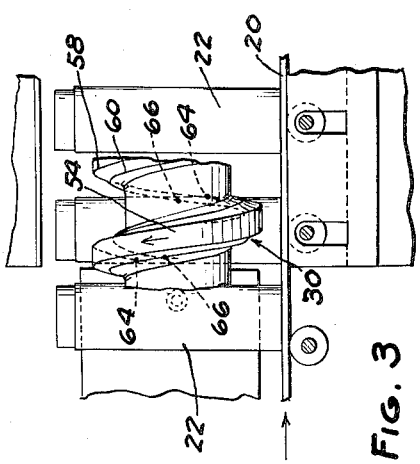
INVENTOR.
LEWIS H. KINSLEY
BY
Barnes, Kisselle, Raisch & Choate
ATTORNEYS ота
United States Patent Office 3,026,991
Patented Mar. 27, 1962

3,026,991
FEED SCREW
Lewis H. Kinsley, 438 Madison Road,
Grosse Pointe Farms, Mich.
Filed Nov. 2, 1959, Ser. No. 850,488
4 Claims. (Cl. 198—34)

This invention relates to a feed screw for cylindrical objects.

In the filling of cylindrical objects such as bottles, for example, it is common to feed these to a filling station on a horizontal conveyor; and at the filling station it is essential that these bottles be regularly spaced for a filling operation before they move on to a capping and boxing operation. This operation has been done by the use of screw devices located horizontally along the conveyor, these screw devices rotating to space the bottles at a filling station. Frequently, due to the fact that the conveyor is running under the bottles, there is a tendency for these bottles to tip as they are being spaced by the screw.

It is an object of the present invention to provide a screw design which stabilizes the bottle on the conveyor and helps to prevent tipping so that the mouth is properly oriented for the filling operation.

Other objects and features of the invention relating to details of construction and operation will be apparent in the following description and claims.

Drawings accompany the disclosure and the various views thereof may be briefly described as:

FIGURE 1, a plan view of the device showing the relationship of the parts.

FIGURE 2, a sectional view on line 2—2 of FIGURE 1.

FIGURE 3, a side elevation of a portion of the screw.

FIGURE 4, a sectional view on line 4—4 of FIGURE 1.

Referring to the drawings, a horizontal conveyor 20 moves a series of bottles 22 between guide rails 24 and 26. At the end of the rail 24 is mounted a horizontal screw spacing device having a root portion 30. This screw is mounted on journals 32 and 34 with a drive shaft 36 projecting from journal 34 having a drive gear 38 driven by a gear 40. Behind the screw 30 is a resilient back plate 42 resiliently mounted on pins 44. A rail 46 continues from the plate 42 connecting to an outlet rail 48 opposed from a second outlet rail 50.

It will be noted that the screw root portion 30 has a single flute extending along its length composed of a gradually increasing flute 52 which enlarges into a fairly wide flute 54. Between the flutes is, of course, a spiral groove extending down to the root portion 30. The flute portion 52 is a single thread gradually increasing in outer diameter and in axial width so that the bottles gradually become spaced. At about the flute designated 56, the spiral flute rib takes on a double thread lead having one crest edge 58 at an outer diameter and a second crest edge 60 at an inner diameter. These crest edges of the flute ribs are designed to contact the cylindrical bottles 22 at spaced points, both axially of the bottle and circumferentially of the bottle, on both sides of the bottle. Thus as the bottle is moved along, it is stabilized by the pressure being applied at the spaced points. Even though the conveyor may be moving at a different rate of speed than the bottles confined in the feed screw, the multiple contact with the bottles tends to stabilize the bottles in their upright position to prevent them from tipping at a feeding station.

The bottle may be in contact with the root of the screw and is stabilized by the back rail 46. In addition, as described, the outer and inner screw crests will be in constant moving contact at spaced points 64 and 66, for example, FIGURE 1, as the bottles move along the screw.

As will be seen in FIGURE 4, the contact points on the two screw crests are spaced vertically and there will be similar double contacts on each side of the bottle. Thus once the bottles are separated so that they no longer furnish each other mutual support, the screw will stabilize each bottle individually even though the conveyor may at certain points in the motion be dragging on the bottom of the bottle due to a travel speed greater than the bottle.

As shown in FIGURE 3, the spaced points on the lead side of the bottle are lower on the bottle than the spaced points on the trailing edge of the bottle; thus, these points resist the overrun motion of the conveyor to tip the bottles.

The conveyor 20 is preferably moving at a speed which synchronizes with the screw at the wide spacing area so that the bottles are properly spaced on the conveyor after they leave the screw for filling operations and such additional operations, as capping, labeling, inspecting, banding and so forth.

I claim:

1. A feed screw and spacing device for elongate circular objects such as upright bottles which comprises a conveyor device for supporting said objects for movement in a defined path, a screw rotating adjacent said path having a single flute rib thereon defining a spiral groove, said flute being shaped with a double thread lead, one thread being formed radially inside and ahead of the other wherein a double, spaced contact is made on a surface of said object positioned on said conveyor adjacent the screw with its axis perpendicular to a plane containing the axis of the screw.

2. In an apparatus in which a screw is used adjacent a horizontal conveyor to space objects such as bottles moving horizontally on the conveyor, an improvement in the screw spacing device which comprises, a screw having a single flute rib defining a spiral groove, said rib increasing in its diameter to space said bottles progressively farther apart along the axis of the screw, the sides of the single flute rib being formed as the screw progresses with a double lead providing spaced crests radially and axially separated, said crests being positioned relative to each other to have simultaneous contact with an article positioned in the groove formed by said flutes wherein to stabilize said article on said conveyor.

3. In an apparatus in which a screw is used adjacent a horizontal conveyor to space objects such as bottles moving horizontally on the conveyor, an improved screw spacing device comprising, a screw positioned horizontally adjacent said conveyor for spacing articles moving on said conveyor, said screw having a single flute rib thereon having outer crests on each side of said rib for contacting the walls of an upright container on said conveyor as said screw rotates, and a second spiral configuration on said flute inside of said outer crest having a secondary crest of smaller diameter positioned also to contact the walls of an article passing along said conveyor in said groove wherein said article receives support from said screw at vertically and circumferentially spaced points.

4. An apparatus as defined in claim 3 in which the contact points on the leading edge of the bottle are vertically spaced downwardly from the contact points on the trailing edge of the bottle to resist any drag tendency of the conveyor to tip the bottle.

References Cited in the file of this patent
UNITED STATES PATENTS

| 1,199,931 | Schroder | Oct. 3, 1916 |
| 1,750,329 | Patchen | Mar. 11, 1930 |
| 2,824,318 | Marzolf | Feb. 25, 1958 |